(12) United States Patent
Kaliaguine et al.

(10) Patent No.: US 7,989,527 B2
(45) Date of Patent: Aug. 2, 2011

(54) POLYMER NANOCOMPOSITES BASED ON SYNTHESIZED LAMELLAR NANOPARTICLES

(75) Inventors: Serge Kaliaguine, Quebec (CA); Mosto Bousmina, Quebec (CA); Christophe Danumah, Edmonton (CA)

(73) Assignee: Universite Laval, Quebec, Quebec (CA)

( * ) Notice: Subject to any disclaimer, the term of this patent is extended or adjusted under 35 U.S.C. 154(b) by 715 days.

(21) Appl. No.: 11/741,949

(22) Filed: Apr. 30, 2007

(65) Prior Publication Data

US 2008/0114106 A1    May 15, 2008

Related U.S. Application Data

(63) Continuation of application No. 10/805,201, filed on Mar. 22, 2004, now abandoned.

(60) Provisional application No. 60/455,879, filed on Mar. 20, 2003.

(51) Int. Cl.
*C08K 3/22* (2006.01)

(52) U.S. Cl. ........ 524/186; 524/403; 524/405; 524/417; 524/418; 524/431; 524/430; 524/433; 524/443; 524/493

(58) Field of Classification Search .................. 524/186, 524/403, 405, 417, 418, 431, 430, 443, 493
See application file for complete search history.

(56) References Cited

U.S. PATENT DOCUMENTS

| | | | | | |
|---|---|---|---|---|---|
| 6,096,803 | A | * | 8/2000 | Pinnavaia et al. | 523/209 |
| 6,528,034 | B1 | * | 3/2003 | Pinnavaia et al. | 423/335 |
| 6,649,083 | B1 | * | 11/2003 | Pinnavaia et al. | 252/179 |
| 6,649,103 | B1 | | 11/2003 | Bousmina et al. | |

OTHER PUBLICATIONS

Hasegawa N. et al., 2000, "Polyolefin-clay hybrids based on modified polyolefins and organophilic clay.", Macromol. Mater. Eng., 280/281, pp. 76-79.
Rong J. et al., 2001, "A Polyethylene Nanoncomposite Prepared via In-Situ Polymerization.", Macromol. Rapid Commun., 22: 329-334.
Chen G. et al., 1998, "Montmorillonite Clay/Poly(methyl methacrylate) Hybrid Resin and Its Barrier Property to the Plasticizer Within Poly(vinyl chloride) Composite.", Journal of Applied Polymer Science, vol. 73, pp. 425-430.
Hackett E. et al., 2000, "Computer Simulation Studies of PEO/Layer Silicate Nanomposites.", Chem. Mater., 12: 2161-2167.
Zanetti M. et al., 2001, "Synthesis and thermal behaviour of layered silicate-EVA nanocomposites.", Polymer, 42: 4501-4507.
Brown J. M. et al., 2000, "Thermoset-Layered Silicate Nanocomposites. Quaternary Ammonium Montmorillonite with Primary Diamine Cured Epoxies.", Chem. Mater., 12: 3376-3384.
Fu X. and Qutubuddin S., 2001, "Polymer-clay noncomposites: exfoliation of organophilic montmorillonite nanolayers in polystyrene.", Polymer, 42: 807-813.

Kresge C.T. et al., 1992, "Ordered mosoporous molecular sieves synthesized by a liquid-crystal template mechanism.", Letters to Nature, vol. 359, pp. 710-712.
Huang X. and Brittain W. J., 2001, "Synthesis and Characterization of PMMA Nanocomposites by Suspension and Emulsion Polymerization.", Macromolecules, 34: 3255-3260.
Xu R. et al., 2001, "New Biomedical Poly(urethane urea)-Layered Silicate Nanocomposites.", Macromolecules, 34: 337-339.
Ren J. et al., 2000, "Linear Viscoelasticity of Disordered Polystyrene-Polyisoprene Block Copolymer Based Layered-Silicate Nanocomposites.", Macromolecules, 33: 3739-3746.
Huang X. et al., 2000, "Synthesis of Polycarbonate-Layered Silicate Nanocomposites via Cyclic Oligomers.", Macromolecules, 33: 2000-2004.
Cho J. W. and Paul D. R., 2001, "Nylon 6 nanocomposites by melt compounding.", Polymer, 42: 1083-1094.
Huang J.-C. et al., 2001, "Poly(etherimide)/montmorillonite nanocomposites prepared by melt intercalation: morphology, solvent resistance properties and thermal properties.", Polymer, 42: 873-877.
Zhao D. et al., 1998, "Triblock Copolymer Syntheses of Mesoporous Silica with Periodic 50 to 300 Angstrom Pores.", Science, vol. 279, pp. 548-552.
Chen Z. et al., 1999, "Synthesis, Characterization and Properties of Clay-Polyacrylate Hybrid Material.", Journal of Applied Polymer Science, vol. 75, pp. 796-801.
Choi M. H. et al., 2000, "Morphology and Curing Behaviors of Phenolic Resin-Layered Silicate Nanocomposites Prepared by Melt Intercalation.", Chem. Mater., 12: 2977-2983.
Wu H.-D. et al., 2001, "Chain Conformation and Crystallization Behavior of the Syndiotactic Polystyrene Nanocomposites Studied Using Fourier Transform Infrared Analysis.", Macromolecules, 34: 2992-2999.
Jang L. W. et al., 2001, "A New Hybrid Nanocomposite Prepared by Emulsion Copolymerization of ABS in the Presence of Clay.", Journal of Polymer Science: Part B, Polymer Physics, vol. 39, pp. 719-727.
Chang J.-H. et al., 2001, "Montmorillonite-Based Nanocomposites of Polybenzoxazole: Synthesis and Characterization (I).", Journal of Polymer Science: Part B. Polymer Physics, vol. 39, pp. 471-476.
Chen T. K. et al., 1999, "Synthesis and Characterization of Novel Segmented Polyurethane/Clay Nanocomposite via Poly(e-caprolactone)/Clay.", Journal of Polymer Science: Part A. Polymer Chemistry, vol. 37, pp. 2225-2233.
Heinemann J. et al., 1999, "Polyolefin nancomposites formed by melt compounding and transition metal catalyzed ethene homo- and copolymerization in the presence of layered silicates.", Macromol. Rapid Commun., 20: 423-430.
Hasegawa N. et al., 1999, "Preparation and Mechanical Properties of Polystyrene-Clay Hybrids.", Journal of Applied Polymer Science, vol. 74, pp. 3359-3364.
Zhang L. et al, 2000, "Morphology and Mechanical Properties of Clay/Styrene-Butadiene Rubber Nanocomposites.", Journal of Applied Polymer Science, vol. 78, pp. 1873-1878.

(Continued)

*Primary Examiner* — Robert D. Harlan
(74) *Attorney, Agent, or Firm* — Norton Rose, LLP

(57) ABSTRACT

The invention relates to polymer nanocomposites comprising synthesized lamellar nanoparticles dispersed in a polymer matrix. The lamellar nanoparticles are synthetically made in a one-step operation by supramolecular assembly of a surfactant and a inorganic precursor and are exfoliated inside the polymer matrix.

13 Claims, 2 Drawing Sheets

OTHER PUBLICATIONS

Ke Y. et al., 1999, "Crystallization, Properties, and Crystal and Nanoscale Morphology of PET-Clay Nanocomposites.", Journal of Applied Polymer Science, vol. 71, pp. 1139-1146.

Bujdak J. et al., 2000, "Effect of Layer Charge on the Intercalation of Poly(ethylene oxide) in Layered Silicates: Implications on Nanocomposite Polymer Electrolytes.", Chem. Mater., 12: 2168-2174.

Suh D. J. et al., 2000, "The property and formation mechanism of unsaturated polyester-layered silicate nancomposite depending on the fabrication methods.", Polymer, 41: 8557-8563.

Morgan A. B. et al., 2001, "Characterization of the Dispersion of Clay in a Polyetherimide Nanocomposite.", Macromolecules, 34: 2735-2738.

Trong On D. et al., 2001, "Perspectives in catalytic applications of mesostructured materials.", Applied Catalysis A: General, 222: 299-357.

Trong On D., 1999, "A Simple Route for the Synthesis of Mesostructured Lamellar and Hexagonal Phosphorus-Free Titania (TiO2).", Langmuir, 15: 8567-8564.

Ulagappan N. et al., 1996, "Preparation of lamellar and hexagonal forms of mesoporous silica and zirconia by the neutral amine route: lamellar-hexagonal transformation in the solid state.", Chem. Commun., pp. 2243-2244.

Huo Q. et al., 1994, "Organization of Organic Molecules with Inorganic Molecular Species into Nanocomposite Biphase Arrays.", Chem. Mater., 6: 1176-1191.

Danumah C. et al., 2003, "Novel Polymer Nanocomposites from Templated Mesostructured Inorganic Materials.", Macromolecules, 36: 8208-8209.

Ray, S. S. and Okamoto M., 2003, "Polymer/layered silicate nanocomposites: a review from preparation to processing.", Prog. Polym. Sci., 28: 1539-1641.

* cited by examiner

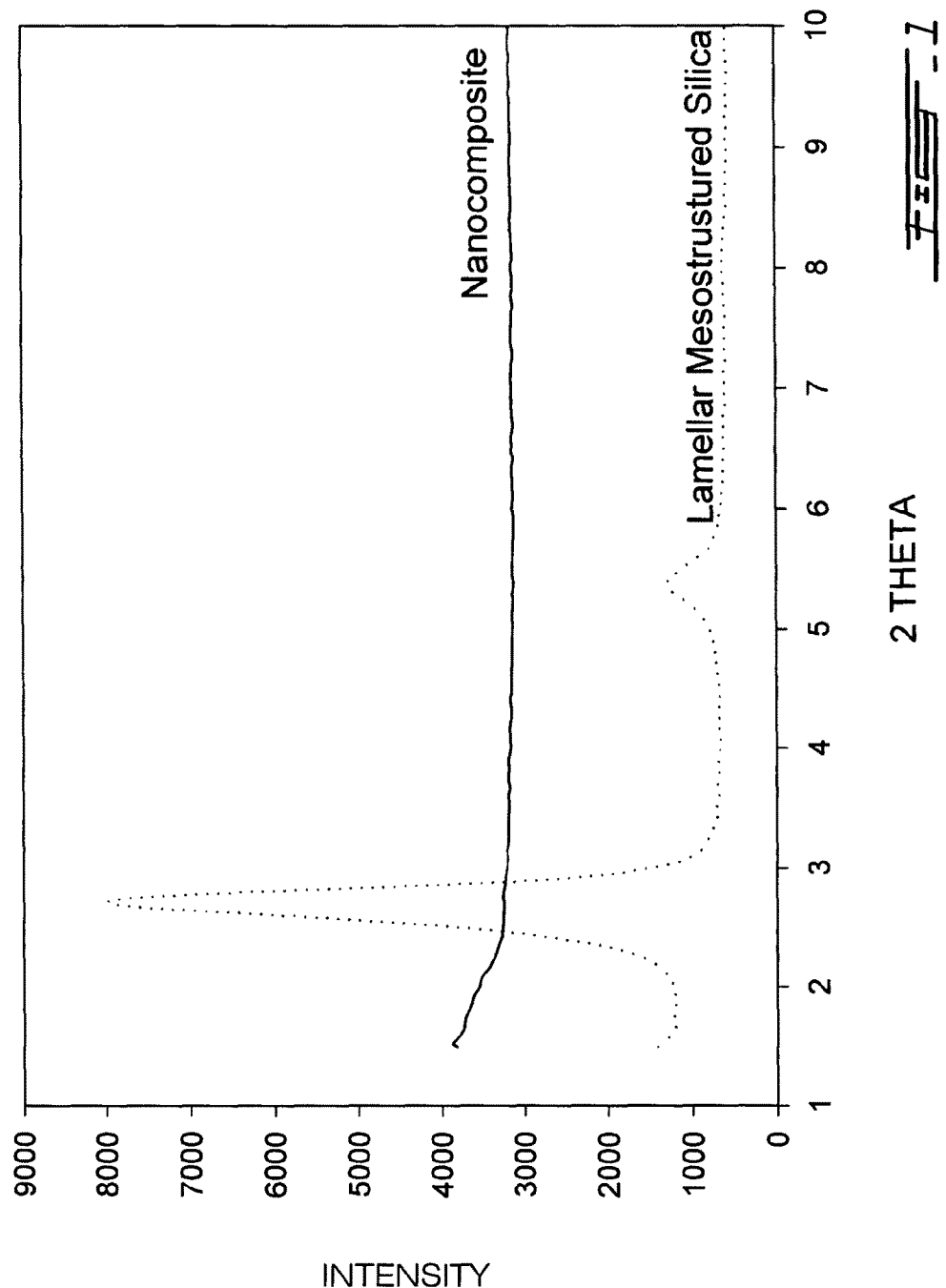

POLYMER NANOCOMPOSITES BASED ON SYNTHESIZED LAMELLAR NANOPARTICLES

CROSS-REFERENCE TO RELATED APPLICATIONS

This application is a continuation, and claims benefit under 35USC§120 of now pending U.S. patent application Ser. No. 10/805,201 filed Mar. 22, 2004 which claims priority under 35USC§119(e) of U.S. provisional patent application 60/455,879, the specification of which is hereby incorporated by reference.

BACKGROUND OF THE INVENTION

1) Field do the Invention

The present invention relates to polymer nanocomposites and, more particularly to polymer nanocomposites having a synthesized dispersed phase. The present invention also relates to a method for producing the above polymer nanocomposites.

2) Description of the Prior Art

Modern applications of polymers are quite demanding and very often the properties of pure materials fail to satisfy their requirements. Polymer nanocomposites (PNCs) consist essentially of inorganic particles with nanometric dimensions dispersed in a single phase or multiphase polymer matrix. They combine the advantages of both classes of materials and widen their application range. Due to their high aspect ratio (typically larger than 50 to 100), volume fractions of inorganic nanoparticles as small as 2 to 7 wt % are enough to impact the PNCs with mechanical properties similar to those obtained upon 30 to 50 wt % addition of glass fiber, without greatly altering the density and the transparency of the matrix.

The most commonly used nanoparticles are made of clays and other lamellar materials with a close composition, for example double hydroxide lamellar compounds (hydrotalcites). For example, nanoparticles made of clay of sodium Montmorillonite class (Na-MMT) that are commercialized in the form of micronic agglomerates of lamellae structured in the form of sandwich-type structure with a thickness of 0.3-1 nm and a length of 50-100 nm for each layer have been used. A dispersion of nanometric layers in the host polymer matrix is obtained in two steps: 1) intercalation and 2) exfoliation. First, a swelling agent, usually a cationic or neutral surfactant, is introduced in intercalation position between the layers, increasing the interlamellar spacing. Shearing stresses are then applied on the intercalated clays which are incorporated into the polymer matrix causing clay exfoliation. Clay leaves with a nanometric thickness are thus well dispersed inside the polymer matrix.

PNCs have been made with a large variety of polymers such as polypropylene, polyethylene, polystyrene, polycarbonate, polyethylene oxide, polyacrylate, polyethylene terephthalate (PET), unsaturated polyester, polyurethane, phenolic and epoxy resins, ethylene vinyl acetate (EVA), styrene butadiene (SBR), acrylonitrile-butadiene-styrene (ABS), polybenzoxazole, polyetherimide, and nylon 6.

The performance of multiphase materials depends on the component properties, composition, structure, particle-particle, and particle-matrix interactions. High barrier, conductive and thermal resistance properties have been reported for PNCs without changing the classical machinery used for thermoplastics. However, the ultimate properties of such PNCs are restricted by the limited intrinsic properties of clays that are difficult to modify due to the high interaction energy between the individual layers.

Well-known in the catalyst field, synthetic nanoparticles are obtained by self-assembly of surfactant molecules that self-organize in supramolecular structures, i.e. liquid crystals assembly of cylindrical, spherical or lamellar micelles. These supramolecular structures may act as templates for mesostructured inorganic materials. Based on this concept, several ordered mesostructured and mesoporous inorganic materials with hexagonal, cubic, and lamellar symmetries were obtained. For the catalyst field, hexagonal and cubic structures are the most interesting since it is possible to extract the surfactant by calcination or ion exchange. The lamellar structure is the easiest to obtain. However, researchers working in the catalysis field tend to avoid this structure with low surface area which frequently collapses when extracting the surfactant. In the PNC field, this structure is suitable due to its high aspect ratio.

SUMMARY OF THE INVENTION

It is an object of the present invention to provide new polymer nanocomposites (PNCs) whose ultimate properties are not limited by those of the nanoparticles.

It is another object of the invention to provide new PNCs wherein the chemical composition of the nanocomposites can be indefinitely modified specific applications.

The above and other objects can be achieved by providing a polymer nanocomposite comprising synthesized lamellar nanoparticles dispersed in a polymer matrix.

The synthesized lamellar nanoparticles are at least partially exfoliated inside a polymer matrix and can be mesostructured.

According to another object of the present invention there is provided a new method to prepare polymer nanocomposites which comprises mixing synthesized lamellar nanoparticles with a polymer matrix under conditions to obtain at least a partial exfoliation of the nanoparticles inside the polymer matrix.

The lamellar mesostructured nanoparticles are synthetically made in a one-step operation by supramolecular assembly of a surfactant and an inorganic precursor. The surfactant tails inside the layers of the inorganic precursor and renders the surface of the inorganic precursor organophilic.

The inorganic precursor of the lamellar nanoparticles is selected from the group of silica, alumina, magnesia, oxides of transition metals, oxides of rare earths, mixed oxides including perovskites and spinels, phosphates including borophosphates, aluminophosphates, silicophosphates, sulfides, and any other nanolamellar materials which can be synthesized by supramolecular assembly.

The surfactant, which can be either ionic or non-ionic, is chosen to be compatible with the polymer matrix.

The polymer can be a thermoplastic polymer, a thermosetting polymer or an elastomer.

Specific interactions between the polymer matrix and the synthesized lamellar nanoparticles can be induced, if necessary, by any unsaturated carboxylic acids, anhydrides, monmethyl maleate, monethyl maleate or esters thereof; or polymer containing these groups such as maleic acid, methacrylic acid, acrylic acid, fumaric acid, phthalic acid, itaconic acid, maleic anhydride, glycidol methacrylate, diethyl maleate, and the like.

Exfoliation of the nanoparticles in the polymer matrix can be carried out in a molten state in an apparatus generating high shear stresses, by in situ polymerization in a solvent or by intercalation of the polymer from a solution.

Applications of these new PNCs are in such fields as photonics, fuel cells, barrier materials for food packaging and gasoline tanks, automotive, medical and aerospace materials, and all other applications where stiffness is desired.

BRIEF DESCRIPTION OF THE DRAWINGS

Further features and advantages of the present invention will become apparent from the following detailed description, taken in combination with the appended drawings, in which:

FIG. 1 is X-ray-diffraction patterns of lamellar mesostructured silica and nanocomposite material.

DETAILED DESCRIPTION OF THE PREFERRED EMBODIMENT

Figure 2A:
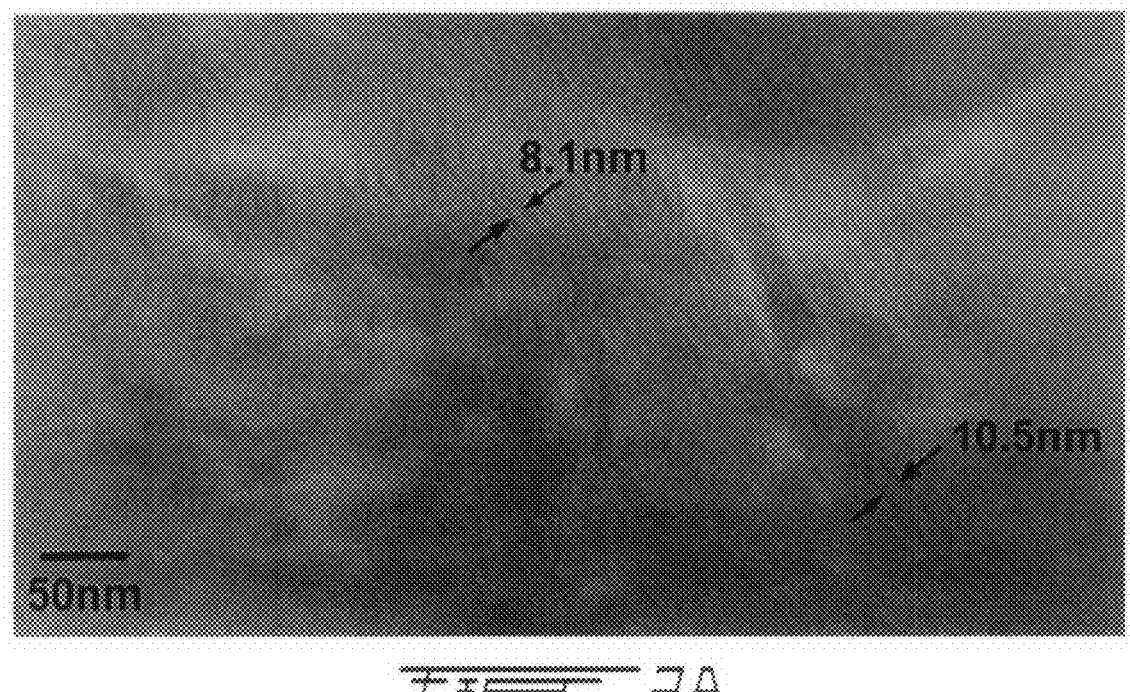
FIG. 2 is transmission electron microscopy micrographs showing the formation of exfoliated layers of mesostructured silica in a polypropylene grafted with maleic anhydride matrix.

The present invention now will be described more fully hereinafter. However, this invention may be embodied in many different forms and should not be construed as limited to the embodiments set forth herein; rather, these embodiments are provided so that this disclosure will be thorough and complete, and will fully convey the scope of the invention to those skilled in the art.

Comparatively to classic materials, nanocomposite materials allow to combine several properties in a same material. Materials characterized simultaneously by high mechanical resistance, transparency, insulating or conductive, and high barrier properties can be obtained. This diversity of properties allows the use of nanocomposite materials in a large application range including those of classical composite materials. Highly stiff and impact resistant materials are obtained with the present invention.

The polymer nanocomposites (PNCs) of the invention are prepared by mixing synthesized lamellar nanoparticles, which can also be mesostructured, with a single phase or a multiphase polymer matrix. These lamellar nanoparticles are suitable for nanocomposites due to their high aspect ratio.

The nanoparticles used differ from the clay particles usually used in this field. The nanoparticles are synthetically made preferably in a one-step operation by supramolecular assembly of a surfactant and an inorganic precursor which generates well intercalated nanolamellaes. The surfactant, which can be ionic or not, is selected in accordance with the desired properties of the nanoparticles and the polymer matrix in which the nanoparticles are exfoliated. The synthesis of the nanolamellar materials can be carried out in an acid, a basic or a neutral medium depending on the surfactant used. The surfactant tails inside the layers of the inorganic precursor and renders the surface of the inorganic precursor organophilic. Self-assembled hybrid organic/inorganic lamellar nanoparticles are thus obtained. As compared to clays, since they are synthetically made, the chemical composition of these nanoparticles can be indefinitely modified by changing or functionalizing the inorganic phase. This allows an excellent control of the physico-chemical properties of the PNCs.

The synthesis strategy can be applied to several nanoparticles made from a wide variety of inorganic precursor such as silica, alumina, magnesia, oxides of transition metals, oxides of rare earths, mixed oxides including perovskites and spinels, phosphates including borophosphates, aluminophosphates, silicophosphates, sulfides, and any other nanolamellar materials which can be synthesized by supramolecular assembly.

For example and without being limitating, ionic surfactants, such as cetyltrimethylammonium chloride, octadecyltrimethylammonium and dioctadecylammonium bromides, and non-ionic surfactants of alkyl amine or sequenced copolymer types can also be used.

To produce the PNCs, the intercalation phase, compulsory when using clay as nanoparticles, is not necessary since the nanoparticles already include intercalated surfactant layers. A surfactant miscible or compatible with the polymer phase is selected to facilitate the exfoliation phase and allows a larger polymer diversity. The polymer can be a thermoplastic polymer, a thermosetting polymer or an elastomer.

Three steps are needed to obtain a partial or full exfoliation of the nanoparticles inside the bulk of the polymer hosting matrix: 1) diffusion of the macromolecular chains inside the relatively open galleries (typical spacing of 3 to 6 nm), 2) interactions between the nanoparticle surfaces and the diffusing macromolecular chains, and 3) delamination of the nanoparticle layers due to strong external stresses. The diffusion process may take place under quiescent conditions by Brownian motion. However, partial exfoliation in this case is very long and may take weeks to occur. Preferably, the diffusion process takes place under flow conditions where the forced diffusion and delamination processes occur simultaneously. The term interaction is taken in the broad sense: it may be physical such as entanglement, chemical such as covalent bonding, or physico-chemical such as hydrogen or electrostatic bonding. Entanglements require a surfactant molecular weight (M) larger than the critical entanglement molecular weight (Mc) of the hosting matrix. When it is not the case, favorable interactions between surfactant tails and the polymer macromolecules should be promoted by specific interactions other than entanglements. The specific interactions may be induced by a compatibilizer which can be any unsaturated carboxylic acids, anhydrides, monmethyl maleate, monethyl maleate or esters thereof; or polymer containing these groups such as maleic acid, methacrylic acid, acrylic acid, ethacrylic acid, fumaric acid, phthalic acid, maleic anhydride, phtalic anhydride, glycidol methacrylate, diethyl maleate, itaconic acid, and the like.

Therefore, exfoliation of the nanoparticles in the polymer matrix can be carried out in a molten state in an apparatus generating high shear stresses such as an internal mixer, an extruder or an injection molding machine. It can also be carried out by in situ polymerization in a solvent. The nanolamellar material can be first swelled into a first solvent and then the polymerization reaction can occur in the same solvent or in a second solvent that is miscible into the first one. Finally, the exfoliation of the nanoparticles can be carried out by intercalation of the polymer from a solution. This method is good for the intercalation of polymers with little or no polarity into the nanolamellar material. If the nature of the solvent is critical in facilitating the insertion of polymers between the layers, polarity of the medium is a determining factor for intercalation.

These new PNCs, not being limited to a given type of inorganic nanophase, allow great control of several properties such as electron or proton conductivity, thermal resistance, photonic and magnetic properties. Moreover, surface modifications of the nanoparticles allow the fine tuning of the interface and the bulk PNC physico-chemical properties.

Applications of these new PNCs are foreseen in such fields as photonics, fuel cells, barrier materials for food packaging and gasoline tanks, automotive, medical and aerospace materials, and all other applications where stiffness is desired.

The present invention will be more readily understood by referring to the following example which is given to illustrate the invention rather than to limit its scope.

Example I

A specific polymer nanocomposite (PNC) is made of a mixture of lamellar mesostructured silica and maleic anhydride modified polypropylene.

The polymer is made of polypropylene grafted with maleic anhydride moities (MODIC-P300F Resin™, Density 0.90 $10^{-3}$ kg m$^{-3}$, Melting temperature, 161° C., Cristallinity, 36%, Elongation at break 547%) provided by Mitsubishi Chemical Co., Japan.

The lamellar mesostructured silica nanoparticles are synthesized in laboratory. They are obtained by supramolecular assembly of a cationic surfactant (oleylalkonium chloride) and tetraethylorthosilicate as inorganic precursor. The surfactant tails inside the oxide layers, renders the oxide surfaces organophilic, and thus promotes the compatibility of the lamellar mesostructured silica nanoparticles with the host polymer phase. In a typical preparation, 9.00 g of surfactant (oleyldimethylbenzylammonium chloride, 38.4% or ammonyx KP, Stepan) is first mixed with 25.00 g of 2 mol/L NaOH and 193.10 g of distilled water under stirring. To this homogenous solution, 19.25 g of tetraethyorthosilicate (TEOS, Aldrich) is added with vigorous stirring for 24 h at room temperature. The resulting product is washed thoroughly with hot deionised water (about 80° C.) to remove the excess of surfactant and dried at room temperature.

Prior to the PNC preparation, the neat maleic anhydride modified polypropylene and the layered mesotructured silica material are dried overnight in a vacuum oven at 70° C. The layered mesotructured silica is then melt-blended by five parts per hundred (phr) in the maleic anhydride modified polypropylene polymer matrix using a Haake-Buchler batch mixer (RHEOCORD SYSTEM 40) at 180° C. and 60 rpm for 30 min.

For exfoliation, interactions between the synthetic lamellar mesostructured nanoparticles and the polymer matrix cannot occur by entanglements since the surfactant molecular weight (M) is smaller than the critical entanglement molecular weight (Mc) of the hosting polymer matrix. Therefore, favorable interactions between surfactant tails and polymer macromolecules are promoted by specific interactions. Specific interactions are obtained through maleic anhydride groups. In fact, nanoparticles blended under the same conditions with pure non-grafted polypropylene matrix did not show any exfoliation. This is likely due to the absence of interactions between the hydrophobic polypropylene matrix and the hydrophilic surface of the lamellar mesostructured silica nanoparticules.

The resulting PNC shows a well exfoliated structure consisting essentially of silica nanolamellae completely delaminated and individually dispersed in the polymer matrix. The structure of lamellar mesostructured silica nanoparticles was assessed by X-ray-diffraction and transmission electron microscopy analyses. X-ray-diffraction patterns were obtained with a powder diffractometer Siemens D5000 using CuKα radiation (λ=1.54184 Å) over 2θ ranges from 1° to 10°. Transmission electron microscopy observations were carried out using a H-9000NAR-Hitachi microscope operated at 300 kV. The samples for transmission electron microscopy observations were ultramicrotomed at room temperature using a diamond knife and deposited on silicon monoxide support for getting a high resolution image.

Figure 2B:
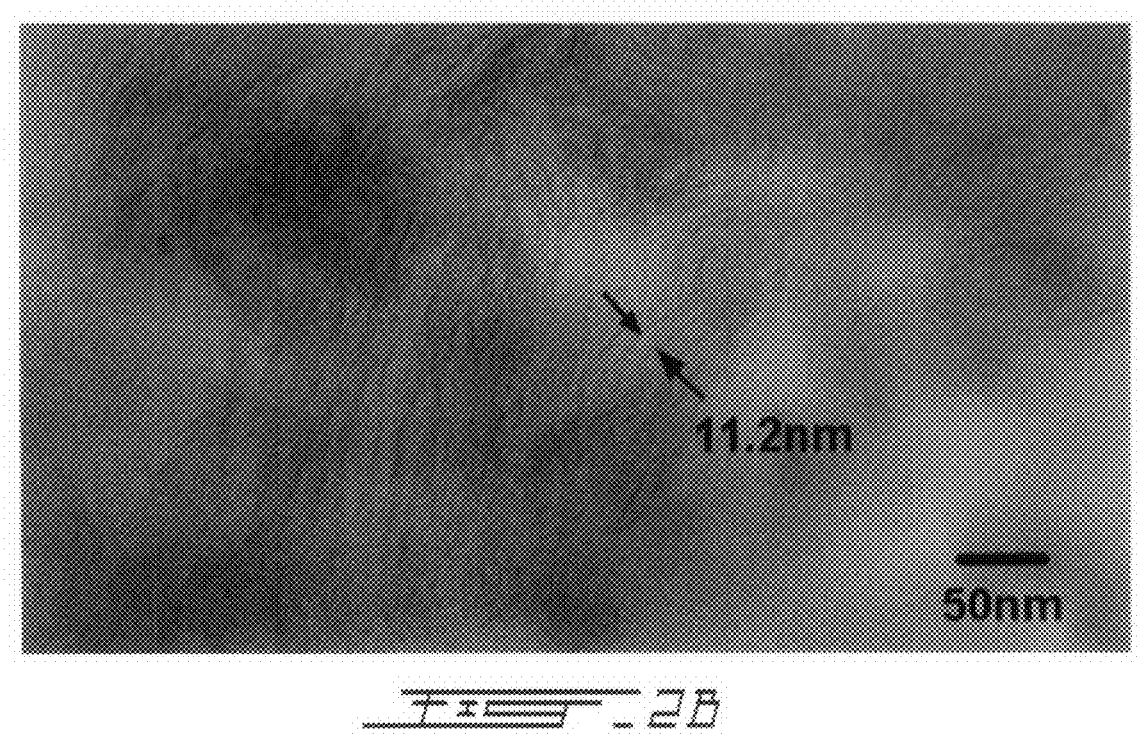

As shown in FIG. 1, the average interlayer spacing of the (001) ($d_{001}$) for the lamellar mesostructured silica nanoparticles obtained by X-ray-diffraction measurement is about 3.25 nm (2θ~2.7°). For the PNC material, such a peak is not observed (a basal spacing>8.8 nm would correspond to 2θ<1°), which implies exfoliation of the lamellae due to shear process and diffusion of polymer chains inside the spacing of the lamellar galleries. The exfoliated structure is also confirmed by transmission electron microscopy observations. FIG. 2 shows the typical structure of the obtained PNC. The nanographs show in fact a well exfoliated morphology with a clear increase of the gallery-spacing of the silica layers compared to the 3.25 nm value of the pure lamellar mesostructured silica nanophase. This gallery spacing is affected by both the nature of the intercalated polymer and the tail length of the surfactant.

Nonsiliceous Mesostructured Lamellar Oxides

Example 2

Mesostructured Lamellar Borophosphates (BPO$_4$) Synthesis

The mesostructured lamellar borophosphates (BPO$_4$) were prepared using the following molar mixture composition:

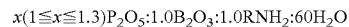
$x(1 \leq x \leq 1.3)P_2O_5:1.0B_2O_3:1.0RNH_2:60H_2O$

The template RNH$_2$ is a primary amine with an alkyl chain R=C$_n$H$_{2n+1}$(12≦n≦18).

In a typical synthesis, 3.1 g of boric acid (ANACHEMIA) was mixed with 54.0 g of distilled water under stirring for 20 min before 6.34 g of phosphoric acid (BDH, 85%) was added. After further stirring for about 15 min, 13.77 g of octadecylamine was added. The mixture was stirred at room temperature for an additional hour. The final reaction mixture was transferred in a 250 cc polypropylene opened bottle and then placed in an oven where the crystallization was carried out at 383 K for 24 h with no stirring. Subsequently, the polypropylene bottle was cooled down at room temperature and the product was thoroughly washed and filtered with anhydrous ether and dried at 373 K for one day.

Example 3

Mesostructured Lamellar Aluminophosphates (AlPO$_4$) Synthesis

The AlPO$_4$ materials were prepared using the following gel composition:

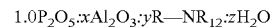
$1.0P_2O_5:xAl_2O_3:yR—NR_{12}:zH_2O$ where x=1-2.0, y=0.125-2.0 and z 60-300. It should be noted that z corresponds to the amount of water added not taking account of water contained in the starting materials. The template R—NR$_{12}$ is a primary (R'=H) or a tertiary (R'=CH$_3$) amine with a long alkyl chain (R=C$_n$H$_{2n+1}$, n=8, 10, 12)

The following is a detailed example of the preparation of a sample. A mixture of 2.42 g of alumina (72% pseudoboemite alumina, catapal B from Vista) and 5 g of water was reacted with 4 g of phosphoric acid (Fisher Scientific, 85%) diluted with 13 g of water under vigorous stirring for about 1 hour. Subsequently, 3.2 g of dodecylamine surfactant was added to the previous mixture, and the mixing continued for an additional hour. The gel thus obtained was transferred into a 150 mL Teflon-lined autoclave and heated statically at 373 K for 24 hours. The autoclave was cold-water-cooled and the sample was then filtered, thoroughly washed with distilled water, and dried at ambient temperature.

This previous recipe (from Hassan Niaki) may be used to prepare a large variety of mesostructured lamellar aluminophosphates using supramolecular ionic or nonionic templates (Tables 1 and 2). During their syntheses, different aluminum sources may also be used (see in Table 1) and it should be noted that the pH of the initial gel is very critical for obtaining mesostructured lamellar materials. The gel obtained was allowed to crystallize in a Teflon-lined autoclave for different times and different temperatures, as reported in Table 1. After crystallization, the solid product was ambient-air-cooled, filtered, washed with deionised water and dried in air at room temperature.

TABLE 1

Outline of mesostructured lamellar aluminophosphates (AlPO$_4$) syntheses using Supramolecular Templates*

| Surfactant | Al-source | Al/P | Surf./Al | Time (h)/Temperature (° C.)/pH$_i$ | Structure |
|---|---|---|---|---|---|
| CTAC | Aluminum isopropoxide | 1 | 0.1 | 120/RT/9.0 | Lamellar |
| Anionic | | | | | |
| DA | Aluminum isopropoxide | 1 | 0.5 | 72/RT/4.1 | Lamellar |
| DDA | " | " | " | 72/RT/4.0 | " |
| HDSA | " | " | " | 48/RT/8.4 | " |
| " | " | " | 0.5 | 48/RT/6.0 | " |
| " | " | " | 1 | 120/150/8.3 | " |
| DDA | AlCl$_3$ | " | " | 72/RT/6.4 | " |
| " | " | " | " | 72/RT/9.0 | " |
| HDSA | " | " | " | 48/RT/6.0 | " |
| " | " | " | " | 48/RT/7.0 | " |
| " | " | " | " | 48/RT/9.0 | " |
| " | " | " | " | 48/RT/11.3 | " |
| Nonionic | | | | | |
| Pluronic P123 | Aluminum isopropoxide | 1 | 0.006 | 120/130/n.d | " |

*Synthesis of mesostructured lamellar AlPO$_4$ at room temperature (RT) and high temperature (130° C.) was carried out at open beaker and Teflon lined stainless-steel autoclave respectively.
nd: not determined.

TABLE 2

Organic templates used for the synthesis of mesostructured lamellar AlPOs

| Template | Designation | Supplier |
|---|---|---|
| Anionic | | |
| Decanoic acid | DA | Sigma |
| Dodecanoic acid | DDA | " |
| 1-hexadecanesulfonic acid (Na salt) | HDSA | " |
| Cationic | | |
| Cetytrimethylammonium chloride | CTAC | Aldrich |
| Nonionic | | |
| EO$_{20}$-PO$_{70}$-EO$_{20}$ block copolymer | Pluronic P123 | BASF |

Example 4

Mesostructured Lamellar Titania (TiO$_2$) Synthesis

Mesostructured lamellar titania was prepared with the following this gel composition:

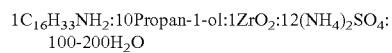

The material was obtained hydrothermally by mixing two different solutions prepared as follow. In the first solution, 5.84 g of tetraethylorthotitanate (TEOT) was added to 50 g of doubly distilled water with constant stirring, whereupon a white precipitate (hydrous titanium oxide) was formed. This stirred slurry was mixed with 30 g of an aqueous H$_2$O$_2$ solution (30 wt % H$_2$O$_2$) at room temperature and stirring continued for 2 h. At this stage, a soluble peroxytitanate ([(TiO$_2$(OH)(H$_2$O)]OH) was formed with the aid of H$_2$O$_2$. The second solution was obtained by mixing 32.8 g of cetyltrimethylammonium chloride (C$_{16}$H$_{33}$N(CH$_3$)$_3$Cl, 25 wt % in water), 20 g of tetramethylammonium hydroxide (TMAOH, 25 wt % in water), and 25 g of water.

The solution 1 was added dropwise to the well-stirred solution 2, and upon complete addition, the mixture was blended for an additional hour. The pH was adjusted with diluted HCl solution to 11.5 and the homogeneous mixture was then transferred into a Teflon-lined autoclave and the crystallization was carried out at 80° C. for 48 h.
(D. T. On, *Langmuir* 15 (1999) 8561-8564).

Example 5

Mesostructured Lamellar Vanadium Oxides Synthesis

In a typical synthesis, 3.81 g of VO(O$^i$Pr)$_3$ was added to 1.46 g of C$_{12}$H$_{25}$NH$_2$ diluted in 5 g of ethanol. After 10 min of stirring for 10 min 15 g of water was slowly added. The precipitated formed was aged at room temperature typically for 24 h. This may be followed by a hydrothermal treatment at 373 K for 24 h in a Teflon-lined autoclave. The product was filtered and washed with water and ethanol and dried at room temperature.

Example 6

Mesostructured Lamellar ZrO$_2$ Synthesis

Lamellar mesostructured zirconia were synthesized by neutral amine route following the method below.

For a detailed preparation, a first mixture was prepared by adding 0.01 mol of the zirconium source (Zirconium isopropoxide, Zr(OPr$^i$)$_4$) to a solution of hexadecylamine (0.01 mol) in propan-1-ol (0.1 mol). Subsequently, (NH$_4$)$_2$SO$_4$ (0.12 mol) and water (x mol) were added under stirring to this previous mixture. The pH of the gel was adjusted to 1.5-2.0 by using dilute HCl. The gel was subjected to hydrothermal treatment at 373 K for 20 h, filtered and washed with acetone.
(N. Ulagapan, Neeraj, Battaram V. N. Raju and C. N. R. Rao, *Chem. Commun.* (1996) 2243-2244.)

Example 7

Other Examples of Mesostructured Lamellar Oxides

Various metal oxides such as W, Sb, Pb, Mg, Al, Mn, Fe, Co, Ni and Zn oxides were prepared in the presence of both anionic (sulphate, phosphate and carboxylate) and cationic (quaternary ammonium salt) surfactants.
(Q. Huo, D. I. Ciesla, D. G. Demuth, P. Feng, T. E. Gier, P. Sieger, A. Firouzi, B. F. Chmelka, F. Schüth, G. D. Stucky, *Chem. Mater.* 6 (1994)1176).

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

We claim:

1. A method of preparing polymer nanocomposites which comprises:
   a) supra-molecular assembling a surfactant and an inorganic precursor to obtain synthesized lamellar nanoparticles;
   b) providing a polymer matrix adapted to interact with said synthesized lamellar nanoparticles;
   c) exfoliating said synthesized lamellar nanoparticles including said surfactant in said polymer matrix under conditions to obtain at least a partial exfoliation of the nanoparticles inside the polymer matrix.

2. A method as claimed in claim 1, wherein said inorganic precursor is selected from the group consisting of silica, alumina, magnesia, oxides of transition metals, oxides of rare earths, mixed oxides including perovskites and spinets, phosphates including borophosphates, aluminophosphates, silicophosphates, sulfides, and any other nanolamellar materials which can be synthesized by supramolecular assembly.

3. A method as claimed in claim 1 which comprises allowing said surfactant to tail inside layers of said inorganic precursor and to render the surface of said inorganic precursor organophilic.

4. A method as claimed in claim 1, wherein said surfactant is compatible with said polymer matrix.

5. A method as claimed in claim 1, wherein said surfactant is miscible with said polymer matrix.

6. A method as claimed in claim 1, wherein said surfactant is ionic.

7. A method as claimed in claim 1, wherein said surfactant is be neutral and is selected from one of an alkyl amine type and a sequenced copolymer type.

8. A method as claimed in claim 1, wherein said polymer is selected from one of a thermoplastic polymer, a thermosetting polymer and an elastomer.

9. A method as claimed in claim 1, wherein said polymer comprises a compatibilizer selected from the group consisting of maleic acid, methacrylic acid, acrylic acid, fumaric acid, phthalic acid, itaconic acid, phthalic anhydride, maleic anhydride, monmethyl maleate, monethyl maleate, and glycidol methacrylate diethyl maleate.

10. A method as claimed in claim 1, wherein said nanoparticles are mesostructured.

11. A method as claimed in claim 1, wherein said exfoliation is carried out under conditions to give a full exfoliation of said nanoparticles.

12. A method as claimed in claim 1, wherein said exfoliation is carried out in one of in a molten state in an apparatus generating high shear stresses, by in situ polymerization in a solvent, and by intercalation of the polymer from a solution.

13. A polymer nanocomposite obtained by the method of claim 1.

* * * * *